United States Patent [19]

Umeyama et al.

[11] Patent Number: 5,032,107
[45] Date of Patent: * Jul. 16, 1991

[54] FLYWHEEL DEVICE WITH A TORSIONAL DAMPER

[75] Inventors: Mitsuhiro Umeyama; Masaki Inui, both of Toyota; Kenichi Yamamoto, Okazaki; Tsuyoshi Sumi; Toshihiro Ohtake, both of Toyota, all of Japan

[73] Assignee: Toyota Jidosha Kabushiki Kaisha, Toyota, Japan

[*] Notice: The portion of the term of this patent subsequent to Aug. 14, 2007 has been disclaimed.

[21] Appl. No.: 418,768

[22] Filed: Oct. 6, 1989

Related U.S. Application Data

[63] Continuation of Ser. No. 278,340, Dec. 1, 1988, abandoned.

[30] Foreign Application Priority Data

Dec. 14, 1987 [JP] Japan ................................. 62-188852

[51] Int. Cl.$^5$ ........................... F16D 3/14; F16F 15/12
[52] U.S. Cl. ......................... 464/68; 74/574; 192/106.2
[58] Field of Search ................ 74/574; 192/106.2; 464/64, 66, 68

[56] References Cited

U.S. PATENT DOCUMENTS

| | | |
|---|---|---|
| 3,266,271 | 8/1966 | Stromberg . |
| 3,514,974 | 6/1970 | Adachi . |
| 4,485,909 | 12/1984 | Gatewood . |
| 4,618,048 | 10/1986 | Kobayashi . |
| 4,662,239 | 5/1987 | Worner et al. .................. 464/68 X |
| 4,698,045 | 10/1987 | Billet et al. ......................... 464/68 |
| 4,714,449 | 12/1987 | Woerner et al. . |
| 4,724,719 | 2/1988 | Werner et al. .................. 464/68 X |
| 4,727,767 | 3/1988 | Aiki et al. ....................... 464/68 X |
| 4,747,800 | 5/1988 | Takeuchi ......................... 464/68 X |
| 4,747,801 | 5/1988 | Chasseguet et al. .................. 464/66 |
| 4,748,868 | 6/1988 | Kobayashi et al. ..................... 74/574 |
| 4,760,754 | 8/1988 | Friedmann . |
| 4,846,759 | 7/1989 | Worner et al. ......................... 464/68 |
| 4,850,932 | 7/1989 | Kagiyama et al. ..................... 464/68 |

FOREIGN PATENT DOCUMENTS

| | | |
|---|---|---|
| 0104823 | 4/1984 | European Pat. Off. . |
| 259173 | 3/1988 | European Pat. Off. . |
| 3410953 | 5/1985 | Fed. Rep. of Germany . |
| 3506818 | 9/1985 | Fed. Rep. of Germany . |
| 3627784 | 7/1987 | Fed. Rep. of Germany . |
| 3642877 | 7/1987 | Fed. Rep. of Germany . |
| 1200013 | 7/1970 | United Kingdom ............. 192/106.2 |
| 2109085 | 5/1983 | United Kingdom . |
| 2157801 | 10/1985 | United Kingdom . |
| 2160296 | 12/1985 | United Kingdom . |
| 2168784 | 6/1986 | United Kingdom . |
| 2180322 | 3/1987 | United Kingdom . |
| 2186344 | 8/1987 | United Kingdom . |
| 2188126 | 9/1987 | United Kingdom ............. 192/106.2 |

Primary Examiner—Daniel P. Stodola
Attorney, Agent, or Firm—Cushman, Darby & Cushman

[57] ABSTRACT

A flywheel device with a torsional damper including a driving side flywheel and a driven side flywheel, a first spring mechanism directly connecting the driving and driven side flywheels, and a second spring mechanism connecting the driving and driven side flywheels via a friction mechanism. The second spring mechanism and the friction mechanism are arranged in series with each other and the series combination of the second mechanism and the friction mechanism is arranged in parallel to the first spring mechanism. The first spring mechanism includes at least one combination of two springs arranged in series with each other. The two springs have a different spring constant or a different maximum angular stroke. Thus, a spring constant of the first spring mechanism changes at a predetermined torsional angle whereby a torque capacity of the flywheel is greatly increased.

17 Claims, 10 Drawing Sheets

FIG. 6
FIG. 7
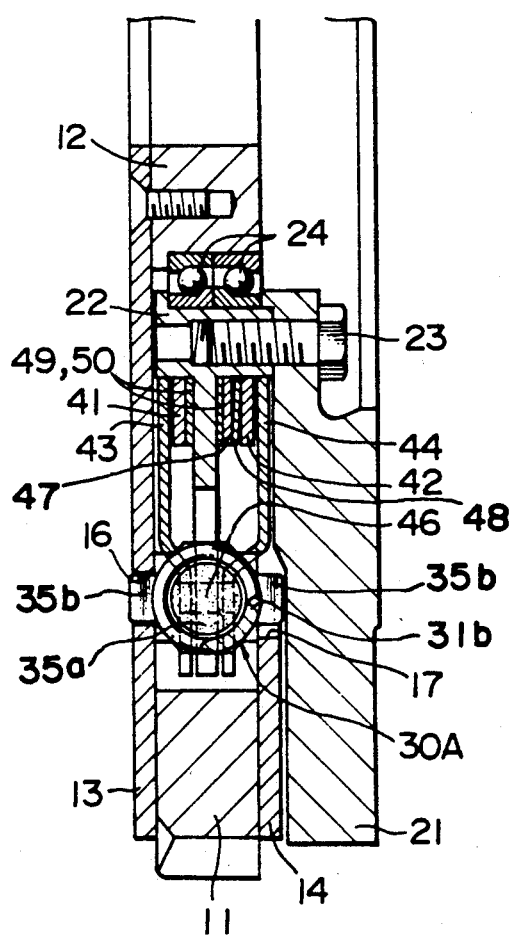
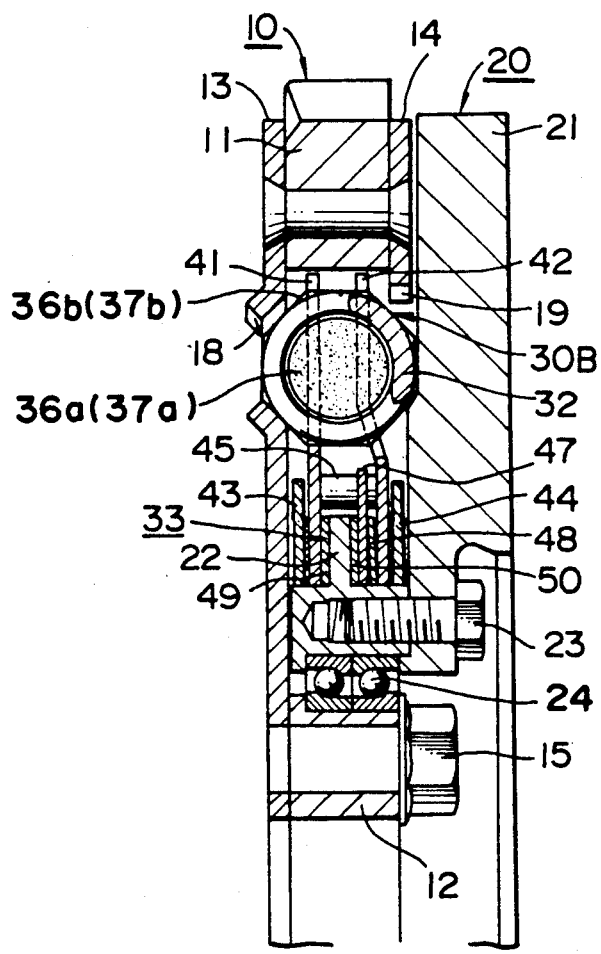

FLYWHEEL DEVICE WITH A TORSIONAL DAMPER

This is a continuation of application No. 278,340, filed Dec. 1, 1988, which was abandoned upon the filing hereof. This application is related to application No. 093,573 filed Sept. 4, 1987; application No. 243,843 filed Sept. 13, 1988; and application No. 237,296 filed Aug. 26, 1988.

BACKGROUND OF THE INVENTION

1. Field of the Invention

The present invention relates to flywheels and, more particularly, to a flywheel having an improved torque capacity, that can change vibrational behavior between two characteristics, thereby suppressing resonance and improving torque variation absorbing effects.

2. Description of the Related Art

Flywheels which include driving and driven side flywheels, a spring mechanism for connecting the driving and driven side flywheels, and a friction mechanism are known, as shown, for example, in U.S. Pat. Nos. 4,468,207, 4,274,524, 4,351,168, 2,042,570, 4,445,876, 2,729,079, 2,437,537, 4,663,983, 4,220,233, 4,002,043; GB-A-2,000,257; DE-A-2,926,012; Automotive Engineering, vol. 93, page 85; Japanese Utility Model Publications SHO 61-23542, SHO 61-23543, SHO 61-23544, SHO 59-113548, SHO 59-108848, SHO 56-6676, and SHO 56-109635; and Japanese Patent Publications SHO 61-59040, SHO 61-59024, and SHO 61-52423. Further, a vibrational system including two kinds of springs arranged in parallel to each other and a friction mechanism arranged in series with one of the two springs is shown in Shock and Vibration Hand Book, vol. 2, McGraw Hill, though it does not relate to a flywheel device.

The prior art flywheels have a single kind of vibrational characteristic generated by a single kind of spring mechanism, even if the spring mechanism itself includes a plurality of coil springs arranged in series or in parallel with each other. The single kind of vibrational characteristic causes the flywheel to have a single first mode resonance speed throughout the entire range of engine speeds. The single resonance speed is usually set lower than the idling speed of the engine. As a result, when the engine speed passes through the resonance speed during start-up or stopping of the engine, the torsional vibration of the flyhweel will be amplified. To suppress the amplification in the torsional vibration, a continuously sliding friction mechanism (often called a hysteresis mechanism) which continuously slides throughout the entire range of engine speeds is disposed between the driving and driven side flywheels.

However, there are two problems with the above-described prior art flywheels. One problem is that a considerably large resonance remains at the resonance speed even if the friction mechanism is provided, because the characteristic of the flywheel is determined more by the spring mechanism than by the friction mechanism. The other problem is that the friction mechanism deteriorates the acceleration tansmittance rate (which corresponds to a damping characteristic of the flywheel device) at the standard range of engine speeds above the idling speed. This is because the frictional force due to the sliding friction mechanism exists over the entire range of engine speeds and because temporary sticking frequently occurs in the friction mechanism.

U.S. application, Ser. No. 07/93,573 filed Sept. 4, 1987 presents a flywheel device designed to overcome the problems of the above-mentioned flywheels. More specifically, that flywheel device has two kinds of spring mechanisms and a momentarily sliding friction mechanism so that the flywheel device has two vibrational characteristics between which the vibrational behavior of the flywheel device changes to thereby suppress the resonance without using a continuously sliding friction mechanism. That device improves the torque transmittance rate (the torque absorbing effect) at a standard range of engine speeds. However, it would be desirable to further improve the torque capacity of the flywheel device described in that application.

SUMMARY OF THE INVENTION

An object of the invention is to provide a flywheel device having two kinds of vibrational characteristics so that the flywheel device can change its vibrational behavior from one characteristic to the other while passing through the resonance speed of the one characteristic of the vibrational system to thereby suppress the resonance without using a continuously sliding friction mechanism.

Another object of the present invention is to provide a flywheel device which can greatly improve its torque variation absorbing effect at a standard range of engine speeds because it does not use a continuously sliding friction mechanism.

Another object of the present invention is to provide a flywheel device which has a greater and thus improved torque capacity, as compared with a flywheel device having two vibrational characteristics.

The above-described objects are achieved by a flywheel device in accordance with the present invention which comprises: a driving side flywheel; a driven side flywheel arranged coaxially with respect to the driving side flywheel and rotatable relative to the driving side flywheel; a first spring mechanism directly connecting the driving and driven side flywheels and including at least one combination of two springs which are arranged in series with each other and have operational ranges different from each other so that when a torsional angle between the driving and driven side flywheels increases, both of the two springs in combination operate up to a predetermined torsional angle and only one of the two springs in combination operates above the predetermined torsional angle; and a second spring mechanism connecting the driving and driven side flywheels via a friction mechanism which is arranged in series with the second spring mechanism. The series combination of the second spring mechanism and the friction mechanism is arranged in parallel to the first spring mechanism as a vibrational system.

The flywheel device in accordance with the present invention has two kinds of vibrational characteristics, that is, a $K+K1$ characteristic and a $K$ characteristic. The $K+K1$ characteristic is obtained when both the first and second spring mechanisms operate, while the $K$ characteristic is obtained when the friction mechanism is sliding to make the second spring ineffective and only the first spring mechanism operates. The flywheel device changes its vibrational behavior between these two characteristics.

When a force acting on the friction mechanism is smaller than the predetermined frictional force of the friction mechanism, such as at a standard range of engine speeds, the flywheel device operates according to the K+K1 characteristic where the friction mechanism is not sliding. Because the friction mechanism does not slide at the standard range of engine speeds, the acceleration transmittance rate is greatly improved.

When the rotational speed of the flywheel device approaches the resonance speed of the K+K1 characteristic, such as at start-up or stopping of the engine, the vibrational amplitude in torsional angle is increased to increase the force acting on the friction mechanism. When the force acting of the friction mechanism finally exceeds the predetermined frictional force of the friction mechanism, the friction mechanism begins to slide to make the second spring mechanism ineffective. Thus, the flywheel device changes its behavior from the K+K1 characteristic to the K characteristic to thereby suppress a resonance while passing through the resonance speed of the K+K1 characteristic.

Further, the first spring mechanism has a spring constant K which changes at the predetermined torsional angle. More particularly, because the two first coil springs of the first spring mechanism operate up to the predetermined torsional angle, the spring constant of the first spring mechanism is not very large. However, because only one of the two first coil springs in combination operates above the predetermined torsional angle, the spring constant of the K spring is greatly increased. Thus, the torque capacity of the first spring mechanism is greatly increased.

BRIEF DESCRIPTION OF THE DRAWINGS

The above and other objects, features and advantages of the present invention will become more apparent and will be more readily appreciated from the following detailed description of the preferred exemplary embodiments of the invention taken in conjunction with the accompanying drawings, in which:

FIG. 6 is an enlarged sectional view of the lower half portion of FIG. 2;

FIG. 7 is an enlarged, sectional view of the upper half portion of FIG. 2;

DETAILED DESCRIPTION OF THE PREFERRED EMBODIMENTS

Figure 1:
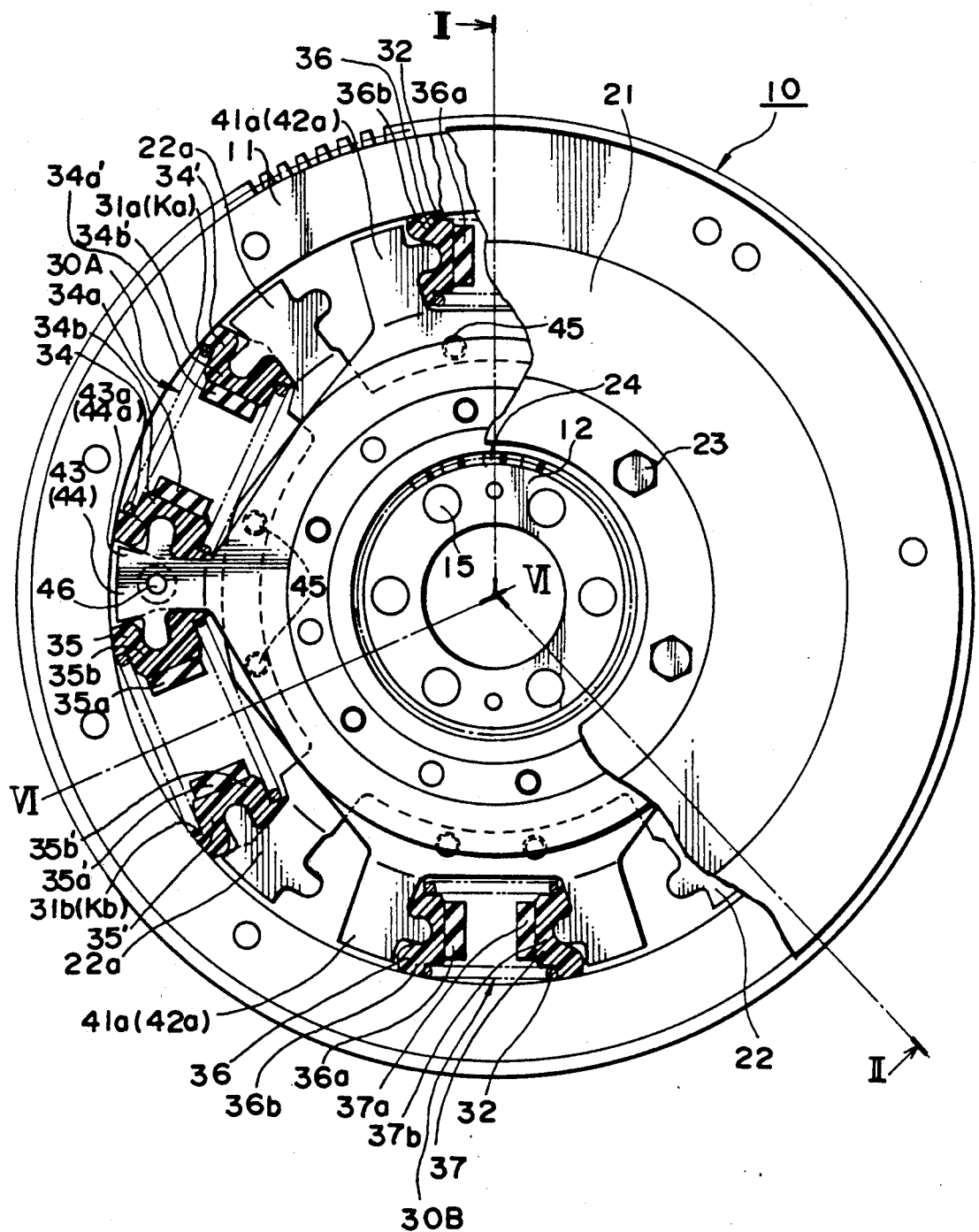
FIG. 1 is an elevational view of a flywheel device with a torsional damper in accordance with the present invention.
Figure 2:
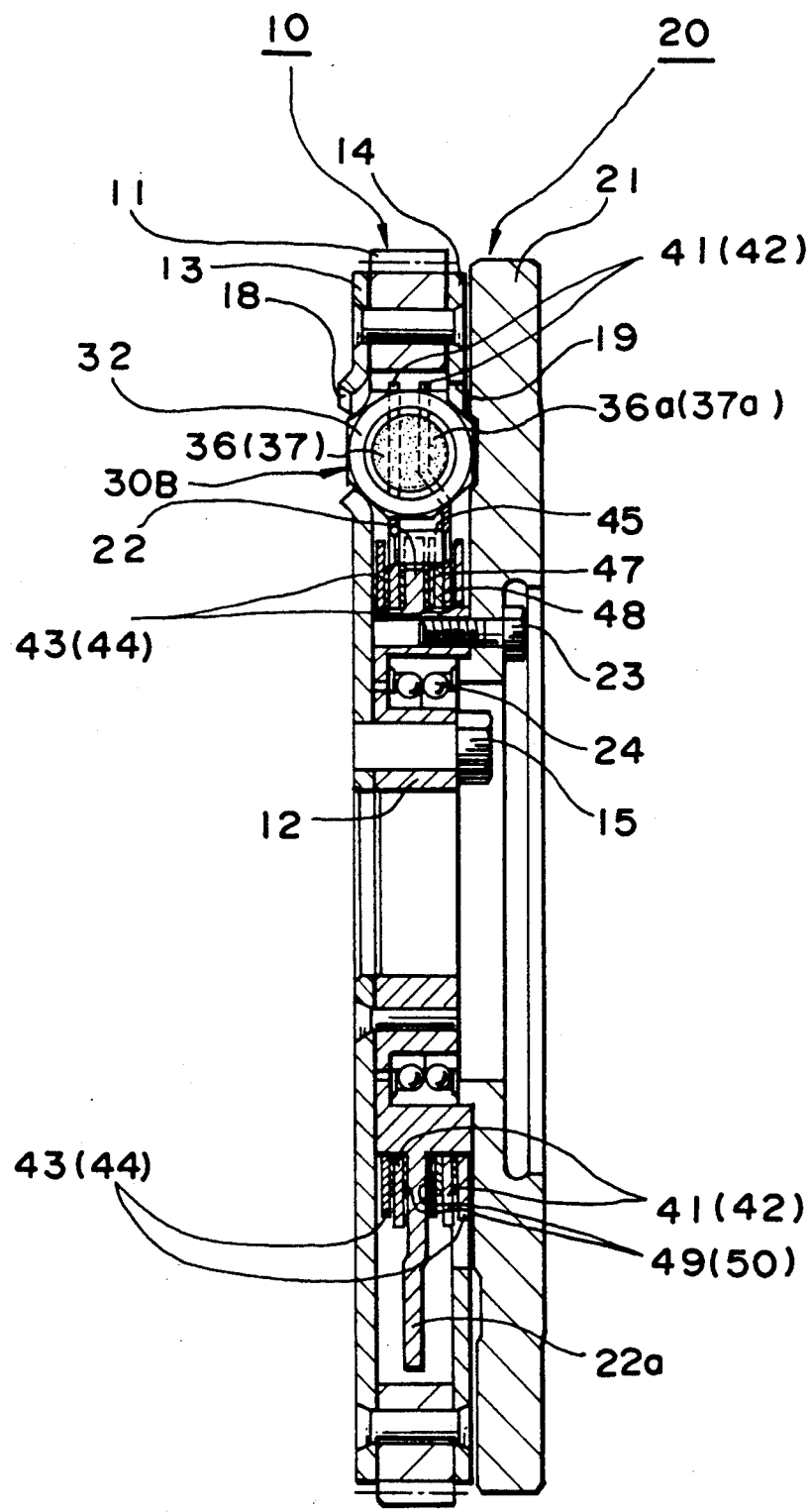
FIG. 2 is a sectional view of the flywheel device of FIG. 1 taken along line II—II of FIG. 1.
Figure 3:
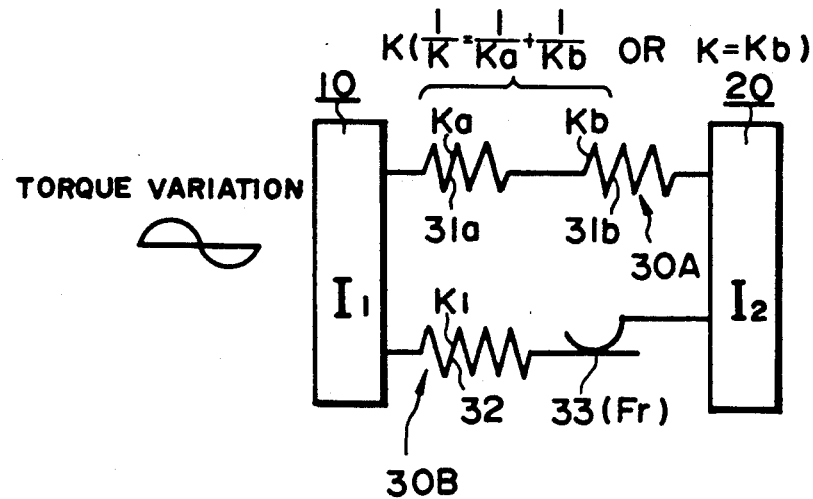
FIG. 3 is a system diagram illustrating a vibrational system of the flywheel device according to the present invention.

As shown in FIGS. 1 and 2 which illustrate an entire structure of a flywheel device of the present invention, and as shown in FIG. 3 which illustrates a schematic system diagram of the flywheel device, the flywheel device of the present invention includes a driving side flywheel 10 and a driven side flywheel 20 which is arranged coaxially with respect to driving side flywheel 10 and rotatable relative to driving side flywheel 10. The flywheel device further includes two kinds of spring mechanisms, that is, a first spring mechanism 30A which directly connects driving and driven side flywheels 10 and 20 and a second spring mechanism 30B which connects driving side flywheel 10 and driven side flywheel 20 via a friction mechanism 33. First and second spring mechanism 30A and 30B function as a torsional damper. First spring mechanism 30A includes at least one combination of two springs 31a and 31b which are arranged in series with one another. Springs 31a and 31b operate such that when the torsional angle (relative rotational angle) between driving and driven side flywheels 10 and 20 increases, springs 31a and 31b, in combination, operate up to a predetermined torsional angle $\theta_R$, and only one of the two first coil springs 31a and 31b, for example, first coil spring 31b, operates above the predetermined torsional angle $\theta_R$. First spring mechanism 30A further includes spring seats 34 and 34' provided at the ends of first coil spring 31a and spring seats 35 and 35' provided at the ends of another first coil spring 31b. Second spring mechanism 30B and friction mechanism 33 are arranged in series with each other as a vibrational system, and the series combination of second spring mechanism 30B and friction mechanism 33 is arranged in parallel to first spring mechanism 30B as a vibrational system. Second spring mechanism 30B includes at least one second coil spring 32 and spring seats 36 and 37 provided at the ends of each second coil spring 32. Friction mechanism 33 has a predetermined frictional force Fr. More particularly, friction mechanism 33 slides or slips when a force acting on friction mechanism 33 exceeds the predetermined frictional force Fr and does not slide or slip when a force acting on friction mechanism 33 is less than or equal to the predetermined frictional force Fr.

Because the series combination of second spring mechanism 30B and friction mechanism 33 is arranged in parallel to first spring mechanism 30A, the flywheel device has the following two characteristics: a K+K1 characteristic with a spring constant K+K1 which is obtained from a summation of a synthetic spring constant K of first spring mechanism 30A and a synthetic spring constant K1 of second spring mechanism 30B; and a K characteristic with a spring constant K which is equal to the synthetic spring constant K of first spring mechanism 30A. The K characteristic naturally has a resonance speed different from a resonance speed of the K+K1 characteristic. Thus, the flywheel device can change its vibrational behavior between the K+K1 characteristic and the K characteristic. More particularly, when a force acting on friction mechanism 33 is less than or equal to the predetermined frictional force Fr of friction mechanism 33 and, accordingly, friction mechanism 33 does not slide, such as at a standard range of engine speeds, the flywheel device operates according to the K+K1 characteristic to thereby decrease its acceleration transmittance rate. On the other hand, when a force acting on friction mechanism 33 is greater than the predetermined frictional force Fr of friction mechanism 33 and, accordingly, friction mechanism 33 is sliding, such as at a speed near to the resonance speed of the K+K1 characteristic, the flywheel device operates according to the K characteristic by shifting from the K+K1 characteristic. Therefore, a resonance of the device is suppressed while passing through the resonance speed of the K+K1 characteristic, such as during start-up or stopping of the engine.

The above-described operation of the two first coil springs 31a and 31b of first spring mechanism 30A is made possible by either one of the following two embodiments:

The first embodiment is one wherein the first coil springs 31a and 31b of first spring mechanism 30A have spring constants Ka and Kb, respectively, which are different from each other, while maximum angular strokes $\theta_{aT}$ and $\theta_{bT}$ of the two springs 31a and 31b, respectively, may be the same as each other. Because spring constants Ka and Kb are different from each other, when the torsional angle $\theta$ between driving and driven side flywheels 10 and 20 increases, spring seats 34 and 34' provided at the ends of one first coil spring 31a, having the smaller spring constant Ka, are first brought into contact with each other at the predetermined torsional angle $\theta_R$. Then, spring seats 35 and 35' provided at the ends of the other first coil spring 30b, having the larger spring constant Kb, are brought into contact with each other at a torsional angle larger than the predetermined torsional angle $\theta_R$. In other words, because the two first coil springs 31a and 31b are arranged in series with each other and are balanced in torque, a relationship of T=Ka $\theta$a=Kb $\theta$b exists between the first coil springs, where T is a common torque acting on the two first coil springs 31a and 31b, $\theta$a is an angular stroke of first coil spring 31a, and $\theta$b is an angular stroke of another first coil spring 31b. When Kb is larger than Ka, $\theta$a becomes larger than $\theta$b, which means that first coil spring 31a is more deformed in the circumferential direction of the flywheel device than first coil spring 31b. As a result, where the maximum angular stroke $\theta_{aT}$ of first coil spring 31a is equal to the maximum angular stroke $\theta_{bT}$ of first coil spring 31b, spring seats 34 and 34' provided at the ends of first coil spring 31a are first brought into contact with each other and then spring seats 35 and 35' provided at the ends of first coil spring 31b are brought into contact with each other, when the torsional angle between driving and driven side flywheels 10 and 20 increases.

In the second embodiment, the maximum angular stroke $\theta_{aT}$ of one first coil spring 31a and the maximum angular stroke $\theta_{bT}$ of the other first coil spring 31b of the two first coil springs 31a and 31b in combination of first spring mechanism 30A are different from each other, while spring constants Ka and Kb of the first coil springs 31a and 31b are equal to each other. At the maximum angular stroke $\theta_{aT}$, spring seats 34 and 34' provided at the ends of first coil spring 31a are brought into contact with each other, and at the maximum angular stroke $\theta_{bT}$, spring seats 35 and 35' provided at the ends of first coil spring 31b are brought into contact with each other. Because these maximum angular strokes are different from each other, when the torsional angle $\theta$ between driving side flywheel 10 and driven side flywheel 20 increases, spring seats 34 and 34', having the smaller maximum angular stroke $\theta_{aT}$ therebetween, are first brought into contact with each other at the predetermined torsional angle $\theta_R$, and then spring seats 35 and 35', having the larger maximum angular stroke therebetween, are brought into contact with each other at a torsional angle larger than the predetermined torsional angle $\theta_R$.

Figure 4:
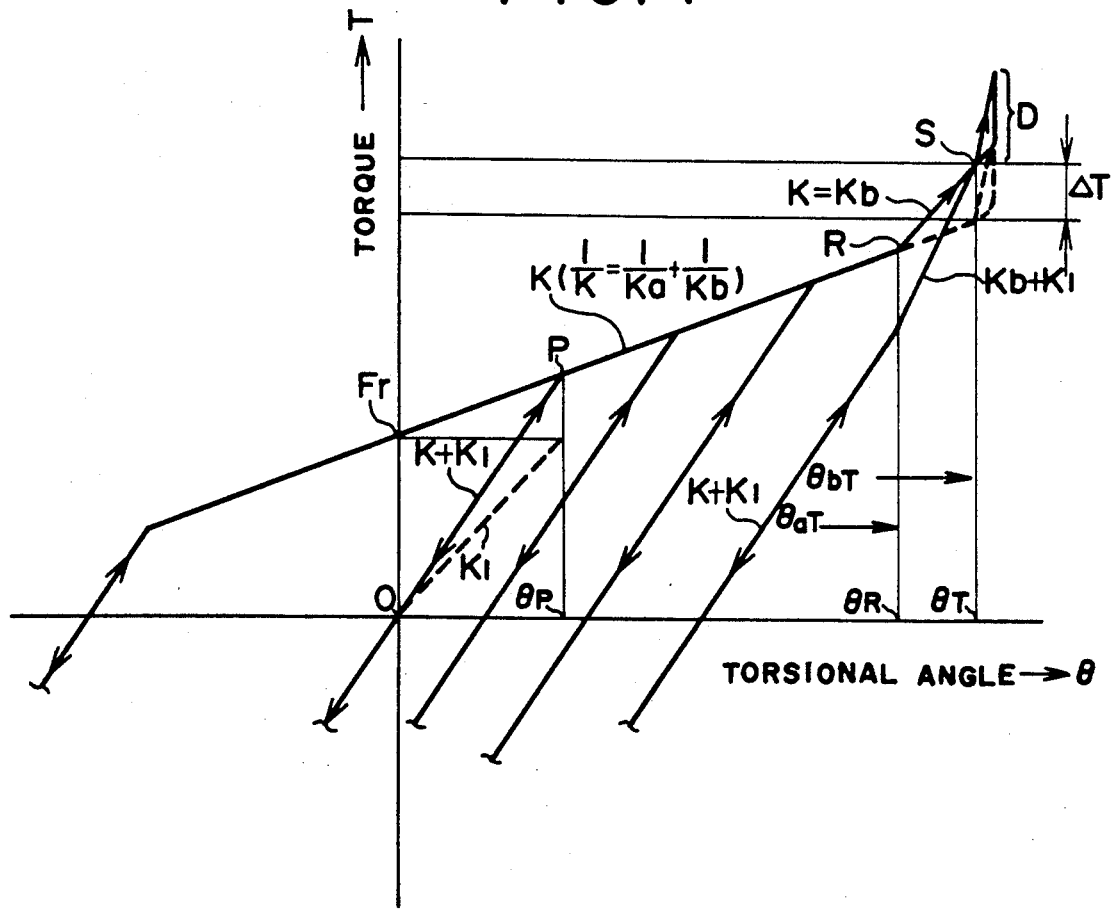
FIG. 4 is a diagram illustrating a torsional angle-torque characteristic of the flywheel device according to the present invention.

With either of the above-described embodiments, when the torsional angle between driving and driven side flywheels 10 and 20 increases, the spring constant K of first spring mechanism 30A is determined by the following relationships which are shown in FIG. 4.

(i) Before spring seats 34 and 34' first contact each other at torsional angle $\theta_R$, the spring constant K of first spring mechanism 30A is obtained from the following equation:

$$1/K = 1/Ka + 1/Kb.$$

(ii) After spring seats 34 and 34' first contact each other at the torsional angle $\theta_R$ and before spring seats 35 and 35' contact each other at the torsional angle $\theta_T$, the spring constant K of first spring mechanism 30A is obtained from the following equation:

$$K = Kb.$$

Figure 14:
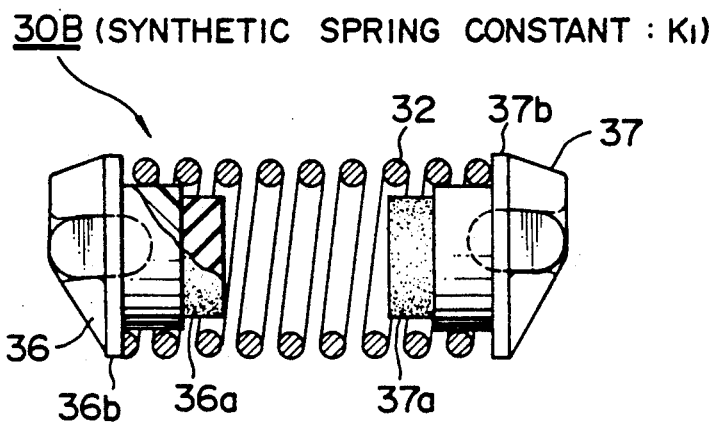
FIG. 14 is an enlarged, side view of a second spring mechanism of the flywheel device of FIG. 1.
Figure 15:
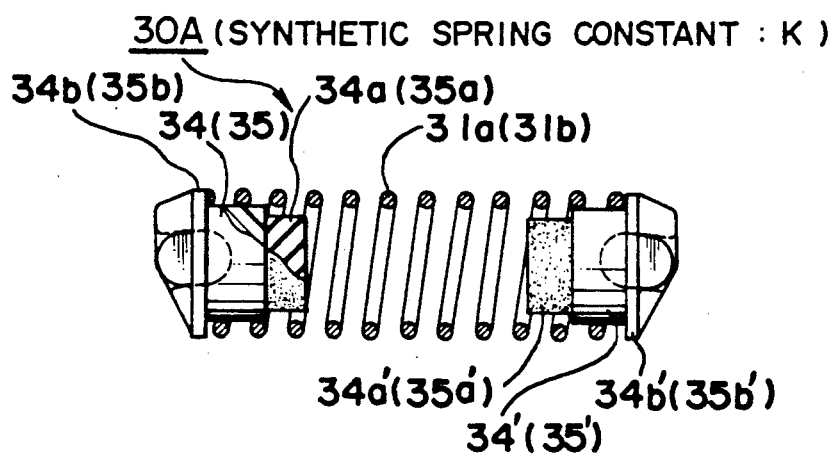
FIG. 15 is an enlarged, side view of a first spring mechanism of the flywheel device of FIG. 1.

As shown in FIGS. 1, 14 and 15, spring seats 34, 34', 35, 35', 36, and 37 include seat portions 34b, 34b', 35b, 35b', 36b, and 37b, respectively, which are constructed of hard synthetic resin. Further, spring seats 34, 34', 35, 35', 36, and 37 include cushions 34a, 34a', 35', 35a', 36a, and 37a, respectively, which are constructed of elastic rubber. Cushions 34a, 34a', 35a, 35a', 36a, and 37a are fixed to spring seats 34b, 34b, 35b, 35b', 36b, and 37b, respectively, and face the opposing spring seats. One cushion may be provided for each of the paired spring seats 34 and 34', 35 and 35', and 36 and 37.

Figure 11:
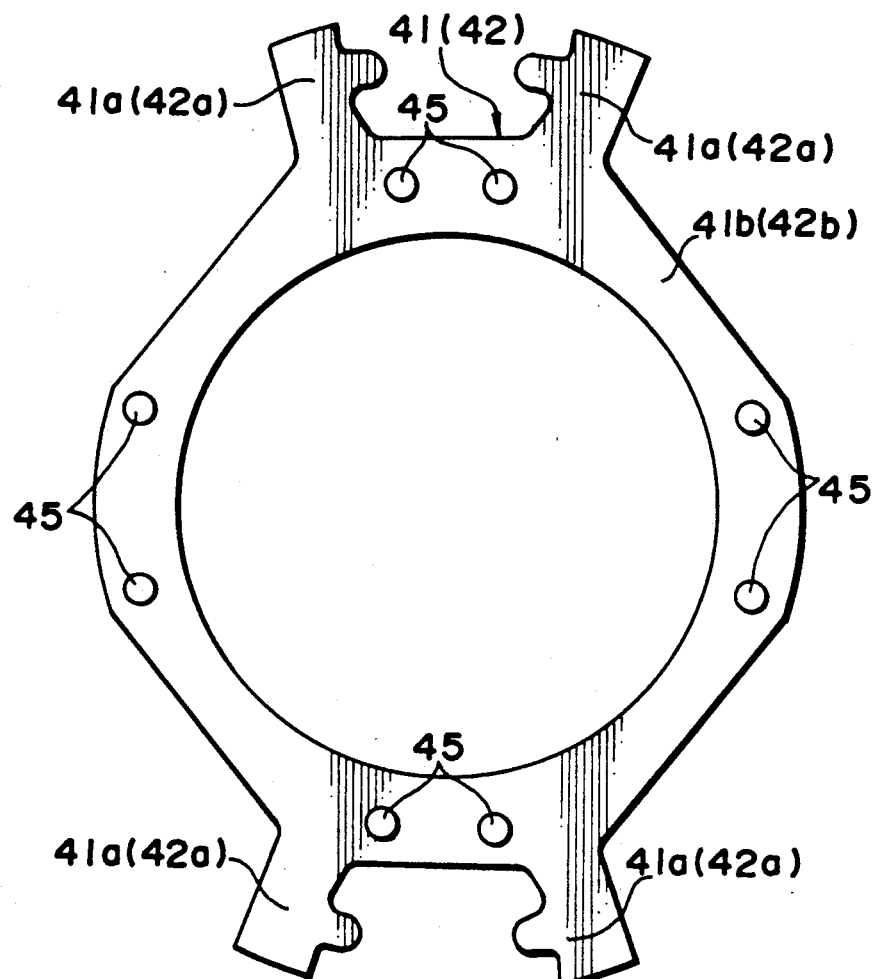
FIG. 11 is an elevational view of a first control plate of the flywheel device of FIG. 1.

As shown in FIG. 1, second spring mechanism 30B and friction mechanism 33 are coupled to each other via a pair of first control plates 41 and 42 which are rotatable relative to driving and driven side flywheels 10 and 20. As shown in FIGS. 2 and 7, first control plates 41 and 42 are arranged so as to oppose each other in the axial direction of the flywheel device and are coupled to each other via an axially extending pin 45 so as to rotate together. As shown in FIG. 11, first control plates 41 and 42 include annular portions 41b and 42b, respectively, and a plurality of arms 41a and 42a extending radially outwardly from the annular portions 41b and 42b, respectively. Annular portions 41b and 42b slidably engage friction mechanism 33, and arms 41a and 42a detachably engage second spring mechanism 30B in the circumferential direction of the flywheel device. More specifically, arms 41a and 42a detachably contact spring seats 36 and 37 of second spring mechanism 30B.

Figure 12:
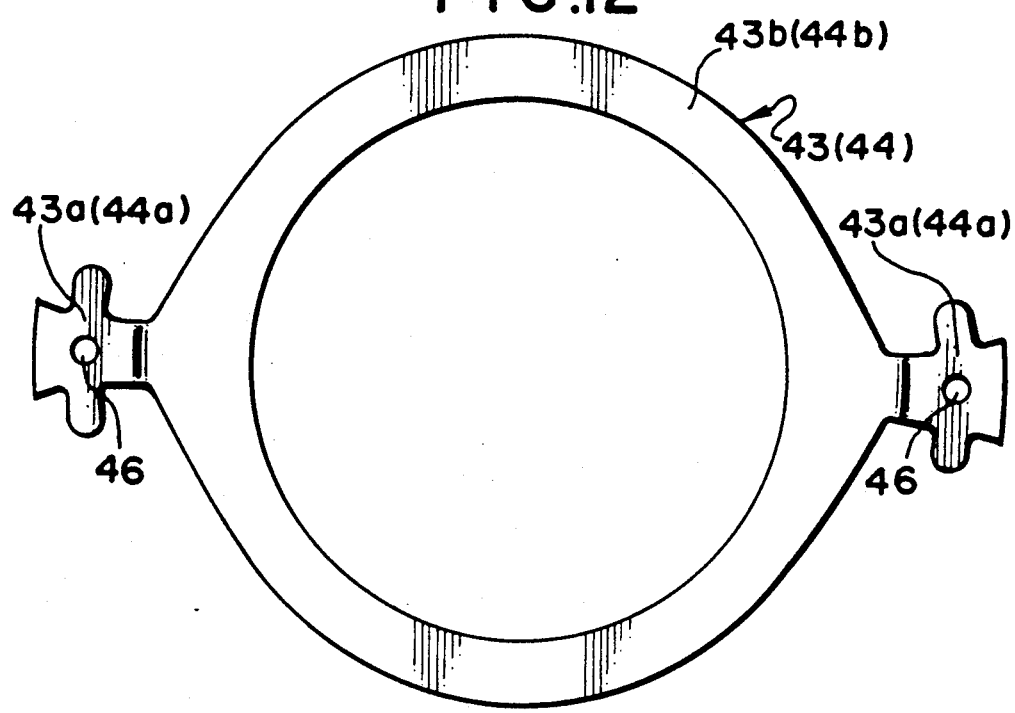
FIG. 12 is an elevational view of a second control plate of the flywheel device of FIG. 1.

As shown in FIG. 1, first coil springs 31a and 31b are coupled to each other so as to be in series with each other as a spring arrangement in the circumferential direction of the flywheel device via a pair of second control plates 43 and 44 which are rotatable relative to driving and driven side flywheels 10 and 20. As shown in FIGS. 2 and 6, second control plates 43 and 44 are coupled to each other via an axially extending pin 46 so as to rotate together. As shown in FIG. 12, second control plates 43 and 44 include annular portions 43b and 44b, respectively, and arms 43a and 44a extending radially outwardly from the annular portions 43a and 44a, respectively. Arms 43a and 44a of second control plates 43 and 44 engage first spring mechanism 30A so as to connect the two first coil springs 31a and 31b in series via one of spring seats 34 and 34' and one of spring seats 35 and 35'.

Figure 8:
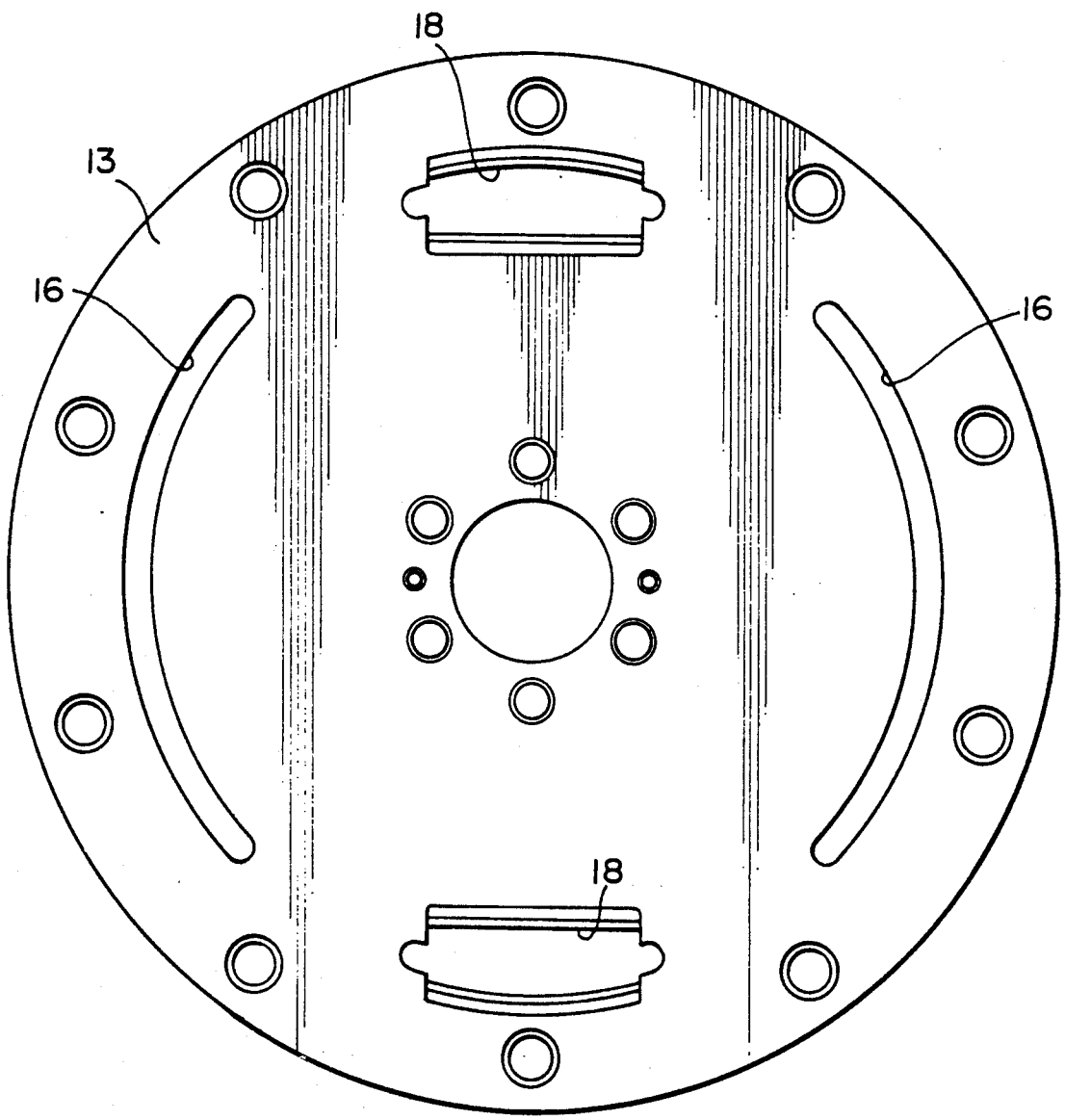
FIG. 8 is an elevational view of one driving plate of the flywheel device of FIG. 1.
Figure 9:
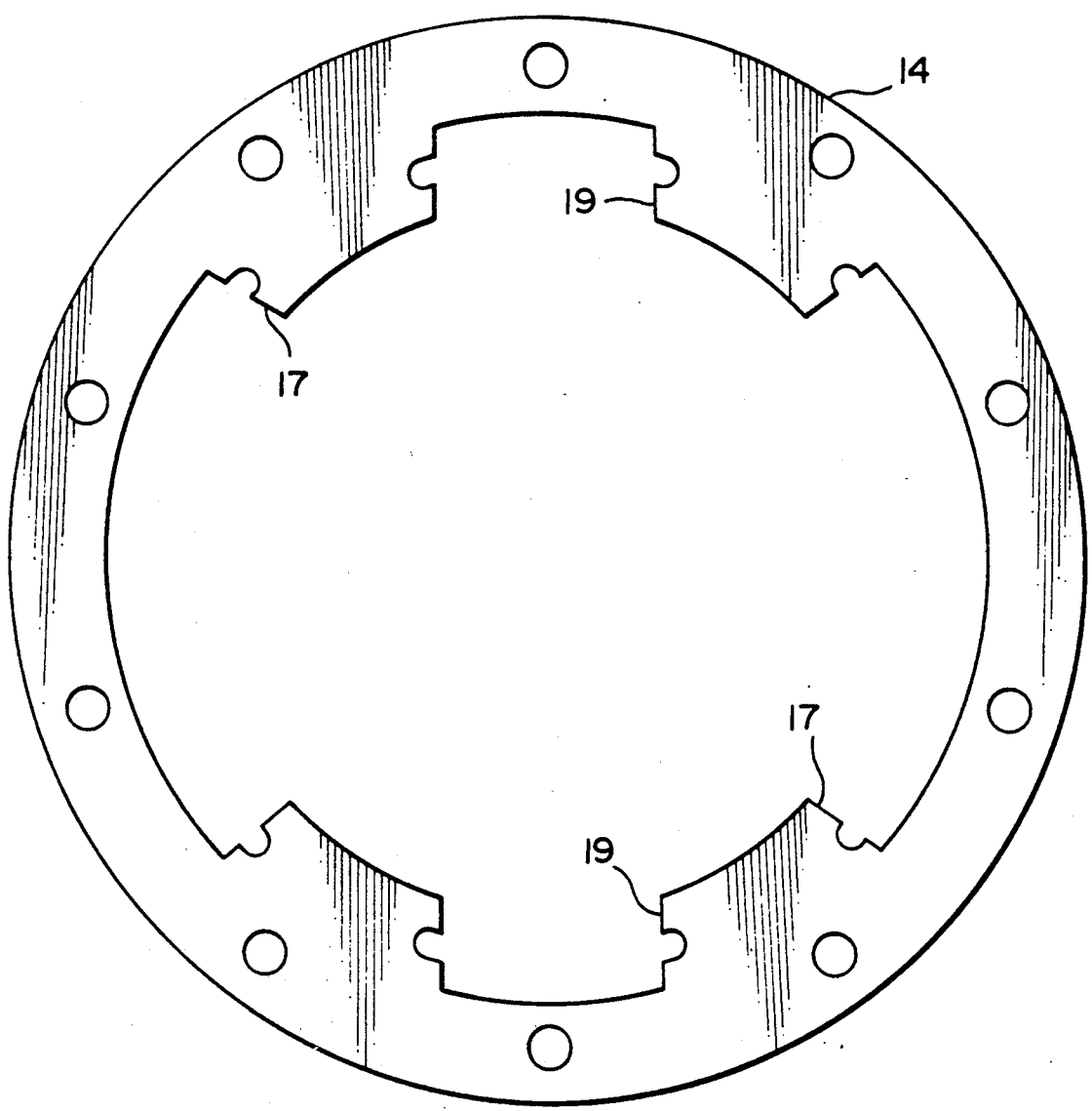
FIG. 9 is an elevational view of another driving plate of the flywheel device of FIG. 1.

As shown in FIGS. 1, 2, 6 and 7, driving side flywheel 10 includes an outer ring 11 including a ring gear, an inner ring 12 disposed radially inside and radially spaced from outer ring 11, and a pair of driving plates 13 and 14 fixedly coupled to outer ring 11. Inner ring 12 is fixed to one of the driving plates 13. Inner ring 12 and driving plate 13 are fixed to an engine crankshaft by a bolt 15. As shown in FIG. 8, driving plate 13 has circumferentially elongated openings or holes 16 and 18 where first and second spring mechanisms 30A and 30B, respectively, are housed so as to be detachable from the longitudinal ends of openings or slots 16 and 18 in the circumferential direction of the flywheel device. As shown in FIG. 9, driving plate 14 has circumferentially elongated slots or recesses 17 and 19 where first and second spring mechanisms 30A and 30B, respectively, are housed so as to be detachable from the longitudinal ends of slots or recesses 17 and 19 in the circumferential direction of the flywheel device. Openings 16 and 18 axially oppose slots 17 and 19, respectively.

Figure 10:
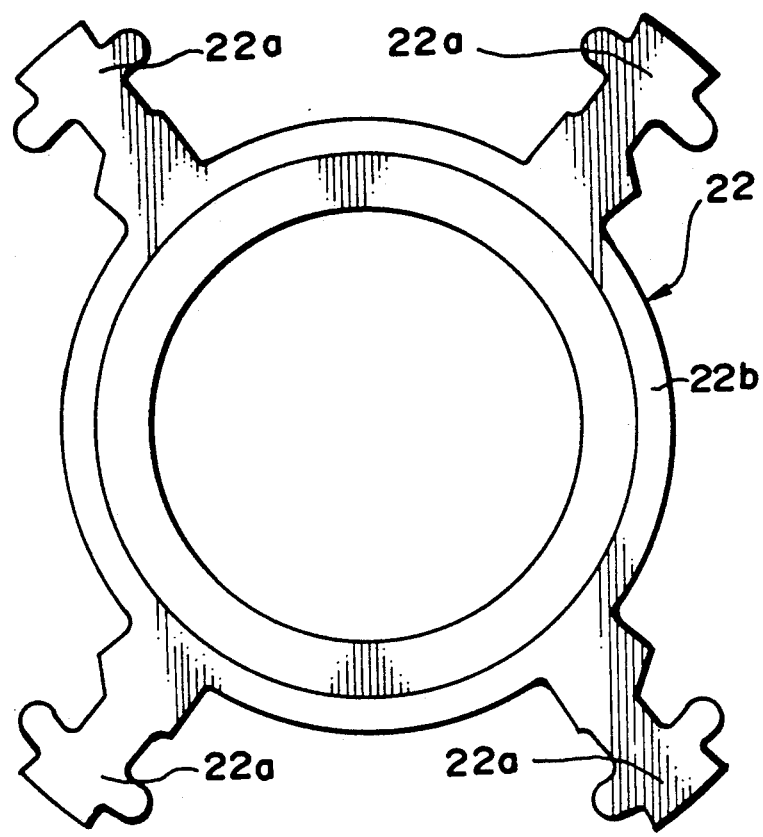
FIG. 10 is an elevational view of a driven plate of the flywheel device of FIG. 1.

As shown in FIGS. 1, 2, 6 and 7, driven side flywheel 20 includes a flywheel body 21 arranged so as to oppose driving side flywheel 10 in the axial direction of the flywheel device and a driven plate 22 fixedly coupled to flywheel body 21. Driven plate 22 is rotatably supported by driving side flywheel 10 via a bearing 24. As shown in FIG. 10, driven plate 22 includes an annular portion 22b and a plurality of arms 22a extending radially outwardly from annular portion 22b. Annular portion 22b of driven plate 22 slidably engages friction mechanism 33 and arms 22a of driven plate 22 detachably engage first spring mechanism 30A in the circumferential direction of the flywheel device.

Figure 13:
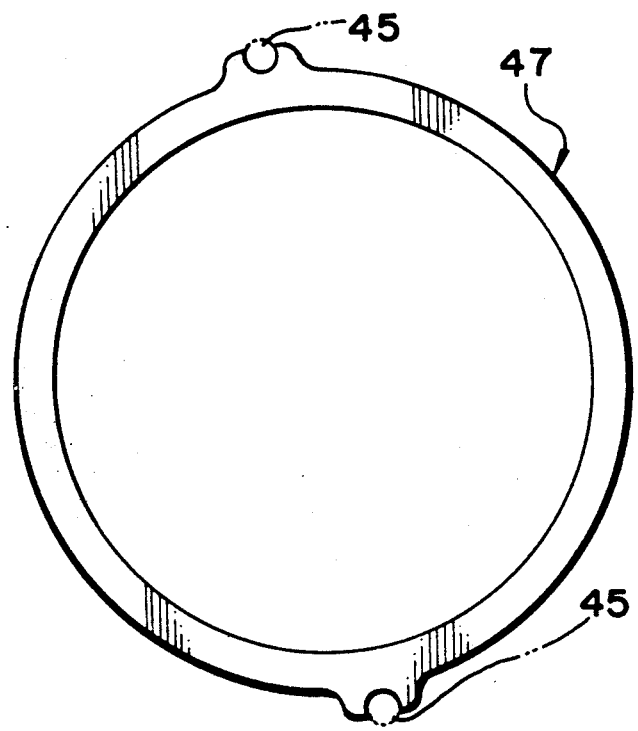
FIG. 13 is an elevational view of a thrust plate of a friction mechanism of the flywheel device of FIG. 1.

As shown in FIGS. 1, 2, 6 and 7, friction mechanism 33 includes an annular thrust lining 49 constructed of abrasive material, an annular thrust plate 47 constructed of metal, and a cone spring 48 constructed of spring material for generating and determining the predetermined frictional force Fr of friction mechanism 33. Thrust lining 49, 50, thrust plate 47 and cone spring 48 are disposed between driving and driven side flywheels 10 and 20 in the axial direction of the flywheel device. As shown in FIG. 13, thrust plate 47 engages pin 45 which connects first control plates 41 and 42 so that thrust plate 47 rotates together with first control plates 41 and 42.

Next, operation of the flywheel device according to the present invention will be explained in reference to FIGS. 3, 4 and 5.

The flywheel device has the torsional angle-torque characteristic shown in FIG. 4. Though FIG. 4 shows only the characteristic in the positive range, the characteristic in the negative range is symmetric to that in the positive range with respect to point O. When the torsional angle between driving and driven side flywheels 10 and 20 increases, the torque is first transmitted between driving and driven side flywheels 10 and 20 according to the K+K1 characteristic line up to point P which corresponds to torsional angle $\theta_P$ and at which friction mechanism 33 begins to slide. Thus, to point P, both first spring mechanism 30A and second spring mechanism 30B operate. At torsional angle $\theta_P$, the increasing force acting on friction mechanism 33 becomes equal to the predetermined frictional force Fr of friction mechanism 33 and friction mechanism 33 begins to slide to make second spring mechanism 30B ineffective. When the torsional angle between driving and driven side flywheels 10 and 20 further increases from point P, only first spring mechanism 30A operates. From point P to point R which corresponds to the maximum angular stroke of one of the first coil springs, for example, first coil spring 31a, both first coil springs 31a and 31b operate, in combination, but from point R to point S, which corresponds to the maximum angular stroke of the other first coil spring 31b, only first coil spring 31b operates. As shown in FIG. 4, the spring constant K of first spring mechanism 30A changes so as to increase at point R, that is, at the predetermined torsional angle $\theta_R$. Range D of FIG. 4 illustrates a range where the cushions of the spring seats of every spring mechanism are contacting the opposing spring seat and, accordingly, the characteristic of range D has a hysteresis of rubber of the cushions and a very large spring constant.

As is apparent, the vibrational system of FIG. 3 of the flywheel device of FIGS. 1 and 2 has two kinds of vibrational characteristics, that is, the K+K1 characteristic and the K characteristic. The K+K1 characteristic is defined by the two moment of inertias I1 and I2, the moment of inertia of driving side flywheel 10 and the moment of inertia of driven side flywheel 20, respectively, and a spring with a spring constant (K+K1) which is equal to a summation of the synthetic spring constant K of first spring mechanism 30A and the synthetic spring constant K1 of second spring mechanism 30B. On the other hand, the K characteristic is defined by the two moment of inertias I1 and I2 and a spring with a spring constant (K) which is equal to the synthetic spring constant K of second spring mechanism 30B.

The K+K1 characteristic takes place when the force acting on friction mechanism 33 is less than or equal to the predetermined frictional force Fr of friction mechanism 33 and, therefore, friction mechanism 33 does not slide. The K characteristic takes place when the force acting on friction mechanism 33 exceeds the predetermined frictional force Fr and friction mechanism 33 is sliding, because the sliding of friction mechanism 33 makes second spring mechanism 30B ineffective.

Figure 5:
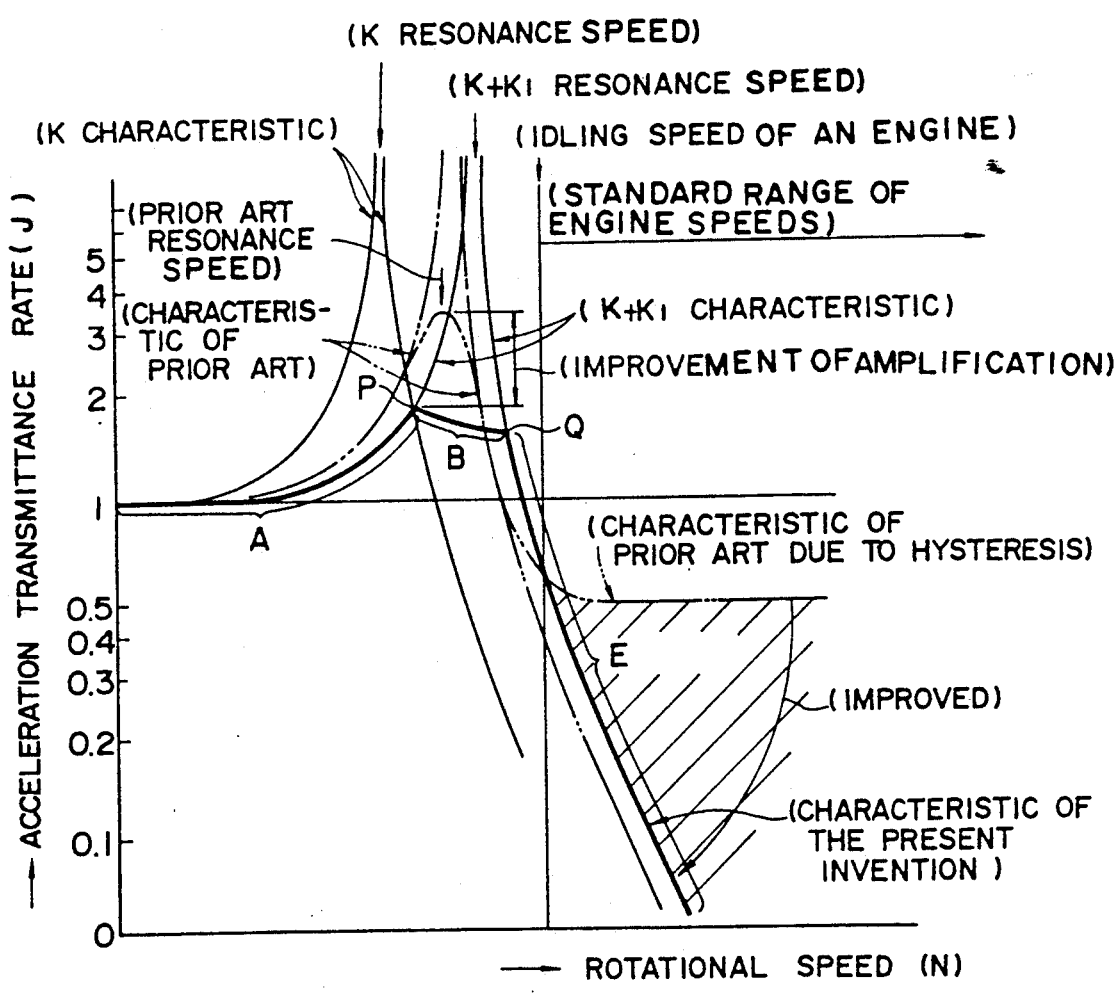
FIG. 5 is a graph illustrating a rotational speed-acceleration transmittance rate characteristic of the flywheel device according to the present invention.

As shown in FIG. 5, the flywheel device operates in accordance with the K+K1 characteristic when the rotational speed of the flywheel device is at a standard range of engine speeds E and at a range of very low engine speeds A, because the force acting on friction mechanism 33 is usually small under these conditions. Because friction mechanism 33 does not slide during the standard range of engine speeds, the torque variation absorbing effect of the flywheel device is greatly improved at the standard range of engine speeds. The hatched portion of FIG. 5 illustrates the improvement of the present invention as compared with the prior art flywheel having a single vibrational characteristic and a single resonance speed. This will be easily understood from the fact that, in a perfect sticking between the driving and driven side flywheels due to a very great frictional force of the friction mechanism, no torque variation absorbing effect is obtained (because the acceleration transmittance rate becomes 1 as is the case in a non-divisible, single and integral flywheel), and that a continuously sliding friction mechanism of the prior art flywheel device acts to deteriorate the acceleration transmittance rate at the standard range of engine speeds.

As shown in FIG. 5, during start-up and stopping of an engine, the rotational speed of the flywheel device passes through the resonance speed of the vibrational system which has been operating according to the K+K1 characteristic. When the rotational speed of the flywheel device approaches the resonance speed of the system with the K+K1 characteristic, the amplitude of relative rotation between driving and driven side flywheels 10 and 20 greatly increases and, as a result, the elastic deformation of second spring mechanism 30B is greatly increased to thereby cause the force acting on friction mechanism 33 to increase. When the increasing force finally exceeds the predetermined frictional force Fr of friction mechanism 33, friction mechanism 33 begins to slide and makes second spring mechanism 30B ineffective. At the same time, the vibrational system changes its behavior from the K+K1 characteristic to the K characteristic, shifting from point P along line B to point Q during the engine start-up and from point Q along line B to point P during the engine stopping, being accompanied by the sliding of friction mechanism 33. Because the resonance speed of the K characteristic is naturally different from that of the K+K1 characteristic, the resonance of the system is greatly suppressed. After the rotational speed of the flywheel device has passed through the resonance speed of the K+K1 characteristic, the amplitude of relative rotation between driving and driven side flywheels 10 and 20 gradually decreases and the force acting on friction mechanism 33 decreases. When the force acting on friction mechanism 33 finally becomes smaller than the predetermined frictional force Fr of friction mechanism 33, friction mechanism 33 stops sliding and, as a result, the flywheel device operates again according to the K+K1 characteristic. This means that the flywheel device has no notable resonance throughout the entire range of engine speeds and the flywheel device can pass through the resonance speed of the K+K1 characteristic without being greatly amplified in vibration.

As discussed above, first spring mechanism 30A of the flywheel device according to the present invention has the synthetic spring constant K which is determined by the following equations:

(1) When the torsional angle between driving and driven side flywheels 10 and 20 is equal to or smaller than the predetermined torsional angle $\theta_R$, $$1/K = 1/Ka + 1/Kb,$$

and (2) When the torsional angle between driving and driven side flywheels 10 and 20 exceeds the predetermined torsional angle $\theta_R$, $$K = Kb.$$

Thus, in FIG. 4 which illustrates the relationship between the torsional angle and the torque, the characteristic line extends obliquely upward with a comparatively small tangent in accordance with an increase in the torsional angle up to the predetermined torsional angle $\theta_R$, and then the characteristic line extends obliquely upward with a comparatively large tangent in accordance with an increase in torsional angle from the predetermined torsional angle $\theta_R$. This change in tangent at the predetermined torsional angle $\theta_R$ greatly increases the torque capacity of the flywheel device. Specifically, the torque capacity increases by an amount denoted by reference delta T as compared with a characteristic, shown by a dotted line in FIG. 4, of a flywheel device of U.S. application Ser. No. 07/93,573 which has two springs in combination arranged in series with each other and having the same spring constants and the same maximum angular strokes.

According to the present invention, the following effects will be obtained:

(a) Because first spring mechanism 30A includes the two first coil springs 31a and 31b which are arranged in series and which have different spring constants Ka and Kb or different maximum angular strokes $\theta_{aT}$ or $\theta_{bT}$, the spring constant K of first spring mechanism 30A is changed at the predetermined torsional angle $\theta_R$ so that the spring constant increases at torsional angles larger than the predetermined torsional angle $\theta_R$ as compared with a spring constant of an imaginary first spring mechanism having two springs in combination with the same spring constants and the same angular strokes. Due to this increase in the spring constant of first spring mechanism 30A, the torque capacity of the flywheel device is greatly improved. In addition, because the increase in the torque capacity is obtained without providing any other spring for transmitting a torque between the driving and driven side flywheels, the increase in the torque capacity is obtained without requiring an increase in size of the flywheel device and a complex design change.

(b) Because the flywheel device of the present invention has two vibrational characteristics having resonance speeds that are different from each other and because the behavior of the flywheel device changes between the K+K1 characteristic and the K characteristic, by shifting its behavior to the K characteristic, the flywheel device can pass the resonance speed of the K+K1 characteristic without being excessively amplified in vibration. Thus, the flywheel device of the present invention has no notable resonance point throughout the entire range of engine speeds.

(c) Because friction mechanism 33 slides only momentarily when the force acting on friction mechanism 33 exceeds the predetermined frictional force Fr of friction mechanism 33, such as while passing through the resonance speed of the K+K1 characteristic, friction mechanism 33 does not slide at a standard range of engine speeds and, thus, the acceleration transmittance rate and the torque absorbing effect at the standard range of engine speeds are greatly improved in accordance with the present invention.

Although a few embodiments of the present invention have been described in detail, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A flywheel device with a torsional damper comprising:
   a driving side flywheel;
   a driven side flywheel arranged coaxially with respect to the driving side flywheel and rotatable relative to the driving side flywheel;
   a first spring mechanism directly connecting the driving and driven side flywheels, the first spring mechanism including at least one combination of two springs which are arranged in series with each other as a spring arrangement and which are operatively related to each other so that when a torsional angle between the driving and driven side flywheels increases, both of the two springs in combination operate up to a predetermined torsional angle and only one of the two springs in combination operates above the predetermined torsional angle; and
   a second spring mechanism connecting the driving and driven side flywheels via a friction mechanism which is arranged in series with the second spring mechanism as a vibrational system, the series combination of the second spring mechanism and the friction mechanism being arranged in parallel to the first spring mechanism as a vibrational system.

2. A flywheel device with a torsional damper comprising:
   a driving side flywheel;
   a driven side flywheel arranged coaxially with respect to the driving side flywheel and rotatable relative to the driving side flywheel;
   a first spring mechanism directly connecting the driving and driven side flywheels, the first spring mechanism including at least one combination of two first coil springs which are arranged in series with each other as a spring arrangement and which are operatively related to each other so that when a torsional angle between the driving and driven side flywheels increases, both of the first coil springs operate, in combination, up to a predetermined torsional angle and only one of the first coil springs operates above the predetermined torsional angle, the first spring mechanism further including spring seats provided at each end of each first coil spring;
   a second spring mechanism including at least one second coil spring and spring seats provided at each end of each second coil spring; and
   a friction mechanism arranged in series with the second spring mechanism as a vibrational system, the series combination of the second spring mechanism and the friction mechanism being arranged in parallel to the first spring mechanism as a vibrational system between the driving and driven side flywheels.

3. The flywheel device according to claim 2, wherein the first spring mechanism has a synthetic spring constant K and the second spring mechanism has a synthetic spring constant K1, and wherein when a force acting on the friction mechanism is less than or equal to a predetermined frictional force of the friction mechanism, the friction mechanism does not slide and the flywheel device operates in accordance with a K+K1 characteristic with a spring constant which is obtained from a summation of the synthetic spring constant of the first spring mechanism and the synthetic spring constant of the second spring mechanism, and when a force acting on the friction mechanism is greater than the predetermined frictional force of the friction mechanism, the friction mechanism slides thereby rendering the second spring mechanism ineffective and the flywheel device operates in accordance with a K characteristic with a spring constant which is equal to the synthetic spring constant of the first spring mechanism.

4. The flywheel device according to claim 2, wherein the two first coil springs have spring constants different from each other so that when a torsional angle between the driving and driven side flywheels increases, the spring seats provided at ends of the first coil spring which has a smaller spring constant are first brought into contact with each other at the predetermined torsional angle, and then the spring seats provided at ends of the other of the first coil spring, which has a larger spring constant, are brought into contact with each other at a torsional angle larger than the predetermined torsional angle.

5. The flywheel device according to claim 2, wherein a maximum angular stroke of one of the first coil springs at which the spring seats provided at the ends of the one first coil spring are brought into contact and a maximum angular stroke of the other of the first coil springs at which the spring seats provided at the ends of the other first coil spring are brought into contact are different from each other, and spring constants of the first coil springs are equal to each other, so that when a torsional angle between the driving and driven side flywheels increases, the spring seats provided with a smaller maximum angular stroke therebetween are first brought into contact with each other at the predetermined torsional angle and then the spring seats provided with a larger maximum angular stroke therebetween are brought into contact with each other at a torsional angle larger than the predetermined torsional angle.

6. The flywheel device according to any one of claims 4 and 5, wherein the first spring mechanism has a spring constant determined from the following equations: (a) when a torsional angle between the driving and driven side flywheels is less than or equal to the predetermined torsional angle, $$K = 1/Ka + 1/Kb,$$

and (b) when a torsional angle between the driving and driven side flywheels is greater than the predetermined torsional angle, $$K = Kb,$$

where,
   K is the spring constant of the first spring mechanism,
   Ka is a spring constant of one of the two first coil springs, and
   Kb is a spring constant of the other of the two first coil springs.

7. The flywheel device according to claim 2, wherein the spring seats provided at the ends of each first coil spring and the spring seats provided at the ends of each second coil spring each include a seat portion constructed of hard synthetic resin, and at least one of the spring seats provided at the ends of each of the first and second coil springs includes a cushion constructed of eastic rubber which is fixed to the seat portion and faces an opposing spring seat.

8. The flywheel device according to any one of claims 1 and 2, further comprising a pair of first control plates which are rotatable relative to the driving and driven side flywheels, the second spring mechanism and the friction mechanism being coupled to each other via the first control plates.

9. The flywheel device according to claim 8, wherein the first control plates are arranged so as to oppose each other in an axial direction of the flywheel device and are coupled to each other via an axially extending pin so as to rotate together.

10. The flywheel device according to claim 8, wherein each of the first control plates includes an annular portion and a plurality of arms extending radially outwardly from the annular portion, the annular portion of each of the first control plates slidably engaging the friction mechanism and the arms of each of the first control plates detachably engaging the second spring mechanism in a circumferential direction of the flywheel device.

11. The flywheel device according to any one of claims 1 and 2, further comprising a pair of second control plates which are rotatable relative to the driving and driven side flywheels, the two first coil springs being coupled to each other via the second control plates in a circumferential direction of the flywheel device so as to be in series with each other as a spring arrangement.

12. The flywheel device according to claim 11, wherein the second control plates are arranged so as to oppose each other in an axial direction of the flywheel device and are coupled to each other via an axially extending pin so as to rotate together.

13. The flywheel device according to claim 11, wherein each of the second control plates includes an annular portion and at least one arm extending radially outwardly from the annular portion, the arm of each of the second control plates engaging the first spring mechanism so as to connect in series the two first coil springs.

14. The flywheel device according to any one of claims 1 and 2, wherein the driving side flywheel includes an outer ring including a ring gear, an inner ring disposed radially inside and radially spaced from the outer ring, and a pair of driving plates fixedly coupled to the outer ring, the inner ring being fixed to one of the driving plates.

15. The flywheel device according to claim 14, wherein the driving plates of the driving side flywheel have circumferentially elongated openings or slots formed in the driving plates, portions of the driving plates which define longitudinal ends of the elongated openings or slots detachably engaging the first and second spring mechanisms in a circumferential direction of the flywheel device.

16. The flywheel device according to any one of claims 1 and 2, wherein the driven side flywheel includes a flywheel body arranged so as to oppose the driving side flywheel in an axial direction of the flywheel device and a driven plate fixedly coupled to the flywheel body, the driven plate including an annular portion and a plurality of arms extending radially outwardly from the annular portion, the annular portion of the driven plate slidably engaging the friction mechanism and the arms of the driven plate detachably engaging the first spring mechanism in a circumferential direction of the flywheel device.

17. The flywheel device according to any one of claims 1 and 2, wherein the friction mechanism comprises a thrust lining, a thrust plate, and a cone spring for generating and determining a predetermined frictional force of the friction mechanism, the thrust lining, the thrust plate and the cone spring being disposed between the driving and driven side flywheels in an axial direction of the flywheel device.

* * * * *